(12) United States Patent
Lunadier et al.

(10) Patent No.: US 8,484,436 B2
(45) Date of Patent: Jul. 9, 2013

(54) PROCESSOR INDEPENDENT LOOP ENTRY CACHE

(75) Inventors: Franck Lunadier, Trets (FR); Frédéric Schumacher, Trets (FR)

(73) Assignee: Atmel Corporation, San Jose, CA (US)

( * ) Notice: Subject to any disclaimer, the term of this patent is extended or adjusted under 35 U.S.C. 154(b) by 239 days.

(21) Appl. No.: 12/874,934

(22) Filed: Sep. 2, 2010

(65) Prior Publication Data

US 2012/0059975 A1    Mar. 8, 2012

(51) Int. Cl.
G06F 13/00  (2006.01)
G06F 13/28  (2006.01)
G06F 9/26   (2006.01)
G06F 9/34   (2006.01)
G06F 9/30   (2006.01)
G11C 8/00   (2006.01)

(52) U.S. Cl.
USPC .................. 711/213; 712/207; 365/230.02

(58) Field of Classification Search
USPC .................. 711/213; 712/207; 365/230.02
See application file for complete search history.

(56) References Cited

U.S. PATENT DOCUMENTS

| | | | | |
|---|---|---|---|---|
| 5,819,079 | A * | 10/1998 | Glew et al. | 712/237 |
| 6,950,919 | B2 * | 9/2005 | Sharma et al. | 711/170 |
| 7,159,103 | B2 * | 1/2007 | Ahmad et al. | 712/241 |
| 7,571,305 | B2 * | 8/2009 | Piry et al. | 712/241 |
| 2005/0015537 | A1 * | 1/2005 | Asaad et al. | 711/2 |
| 2009/0055595 | A1 * | 2/2009 | Gill et al. | 711/137 |

OTHER PUBLICATIONS

Hsieh, Jen-Wei, et al.; "Energy-efficient and Performance-Enhanced Disks Using Flash-Memory Cache;" ISLPED 2007, Aug. 27-29, 2007, Portland, Oregon; pp. 334-339.
CPU cache; Wikipedia, the free encyclopedia; Dec. 17, 2008; http://web.archive.org/web/20081217083817/http://en.wikipedia.org/wiki/CPU_cache; 13 pages.

* cited by examiner

*Primary Examiner* — Brian Peugh
*Assistant Examiner* — Rocio Del Mar Perez-Velez
(74) *Attorney, Agent, or Firm* — Fish & Richardson P.C.

(57) ABSTRACT

A memory controller is configured to receive read requests from a processor and return memory words from memory. The memory controller comprises an address comparator and a loop entry cache. The address comparator is configured to determine a difference between a previous read request address and a current read request address. The address comparator is also configured to determine whether the difference is positive and less than a certain address difference and, if so, indicate a limited backwards jump. The loop entry cache is configured to store a current memory word for the current read request address when the address comparator indicates a limited backwards jump.

22 Claims, 4 Drawing Sheets

PROCESSOR INDEPENDENT LOOP ENTRY CACHE

TECHNICAL FIELD

This subject matter is generally related to electronics, and more particularly to microcontrollers, including embedded non-volatile memory (NVM) controllers.

BACKGROUND

Microcontrollers typically include a processor and one or more types of memories, e.g., volatile and non-volatile memories (NVM). For example, a microcontroller can have both a Static Random Access Memory (SRAM) device and a flash memory device. The processor can access the SRAM more quickly than the flash memory, but because SRAM is expensive, usually the SRAM is small and cannot store the whole software code. Thus, in some microcontrollers, the processor can execute instructions read directly from the flash memory, e.g., without first copying the instructions from the flash memory to the SRAM.

In microcontrollers where the processor fetches instructions directly from embedded NVM, performance can be improved by prefetching instructions. For example, where the NVM is accessed using a wide memory data bus, a pair of prefetch buffers sized accordingly with the memory data bus width can be used to decrease the average number of wait states. Prefetching improves performance particularly when the processor is executing sequential code.

SUMMARY

A memory controller is configured to receive read requests from a processor and return memory words from memory. The memory controller comprises an address comparator and a loop entry cache. The address comparator is configured to determine a difference between a previous read request address and a current read request address. The address comparator is also configured to determine whether the difference is positive and less than a certain address difference and, if so, indicate a limited backwards jump. The loop entry cache is configured to store a current memory word for the current read request address when the address comparator indicates a limited backwards jump.

DETAILED DESCRIPTION

System Overview

Figure 1:
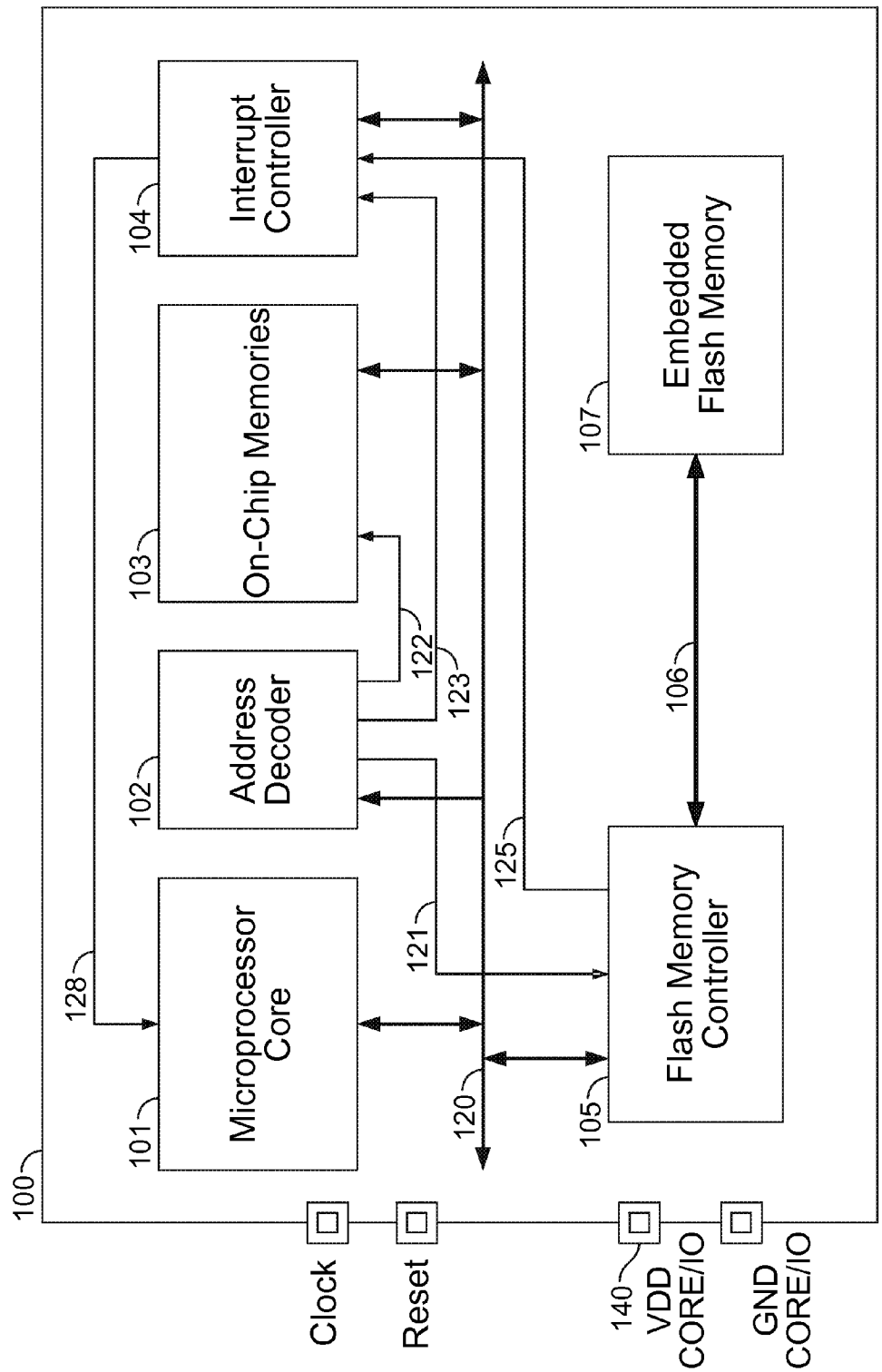
FIG. 1 is a block diagram of an example microcontroller with an embedded flash memory accessed from a microprocessor core through a flash memory controller.

FIG. 1 is a block diagram of an example microcontroller 100 with an embedded flash memory 107 accessed from a microprocessor core 101 through a flash memory controller 105.

The microcontroller 100 comprises a microprocessor 101 configured to access on-chip memories 103, 107 and other peripherals 104, 105. The microntroller 100 is powered by a set of terminals 140. The terminals 140 include, for example, a series of physical access terminals (PADs) to power the microcontroller 100, some for providing a voltage source VDD, some for providing ground GND.

In some implementations, the components of the microcontroller exchange data using a system bus 120 which can include a read data bus carrying data from the peripherals 104, 105 to the microprocessor 101, a write data bus carrying data from the microprocessor 101 to the peripherals 104, 105, and an address bus carrying control signals to indicate transfer direction on the system bus 120. Since the address bus of the system bus 120 is shared by the peripherals 104, 105, an address decoder 102 can be used to decode the values carried on the address bus to select one peripheral at a time. The address decoder 102 is connected to the address bus (part of system bus 120) and can provide select signals 121,122,123. These select signals can be read by memory 103 and the peripherals, 104,105 to take into account values carried on the system bus 120.

The on-chip memory 103 can be selected (e.g., signal 122 is active) when the address value of the address bus matches the address range allocated for the on-chip memory 103. The embedded flash memory controller 105 can be selected (e.g., signal 121 is active) when the address value of the address bus matches the address range allocated for the embedded flash memory controller 105. In some implementations, address ranges are hard-wired in the address decoder 102. In response to being selected, the selected memory 103 or peripheral 104 or 105 provides corresponding data onto the system bus 120, which is read by the microprocessor 101 and processed according to application software.

In some implementations, the microprocessor 101 detects availability of data through the interrupt signal 125. When set, the interrupt signal 125 triggers the interrupt controller 104. Then the interrupt controller 104 transmits the event directly to a dedicated pin of the microprocessor 101 over the data bus 128. When the microprocessor 101 is triggered by the interrupt signal 125, its internal state machine interrupts the processing of the current task and performs a read access on the interrupt controller 104 by means of system bus 120 to get the source (peripheral) of interrupt.

The embedded flash memory 107 stores, for example, application software as executable instructions for the microprocessor 101. The on-chip memory 103 (e.g., SRAM) stores the value of intermediate variables that are used during execution of the application software by the microprocessor 101. The microprocessor 101 fetches the application software using the system bus 120.

The microprocessor 101 can either (1) first copy instructions of the application software from the flash memory 107 into the on-chip memory 103 and then fetch the instructions from the on-chip memory 103, or (2) fetch the instructions from the flash memory 107. In the first case, the access times are generally shorter due to the speed of the on-chip memory 103. The performance of the overall system is typically higher. Nonetheless, the on-chip memory 103 is sized to store the software plus the value of the intermediate variables, which can increase the cost of the microcontroller 100.

In the second case, the size of the on-chip memory 103 can be smaller because it stores the value of the intermediate variables and not the application software. This can decrease the cost of the microcontroller 100. In general, access times are longer in the second case due to the flash memory 107 speed, so that the performance of microcontroller 100 is lower.

The microprocessor 101 accesses the flash memory 107 through a flash memory controller 105. The flash memory controller 105 translates read requests from the system bus 120 into the protocol used by the flash memory 107.

To improve the performance of the microcontroller 100 when fetching instructions directly from the flash memory 107, the embedded flash memory read data bus 106 is wider than the system bus 120. For example, in some implementations, the system bus is 32-bit wide and the memory data bus is 128-bit wide. The flash memory controller 105 performs prefetch. Prefetching includes reading in advance the data located just after the last data accessed, even if it has not been requested. The data read in advance is placed in a cache (e.g., a high speed memory, for instance, a register). When the instruction is actually needed, the instruction can be accessed quickly from the cache.

When the microprocessor 101 fetches an instruction from the flash memory 107 it issues an address and one or more control signals indicating that an instruction read is being performed. The memory controller 105 then typically performs prefetch starting from the flash address of the requested instruction. Prefetching improves performance when the next instructions are sequentially fetched. In some implementations, the memory controller 105 identifies loop entry instructions and caches the loop entry instructions. Identifying and caching loop entry instructions is discussed further below with reference to FIGS. 2-4.

Although FIG. 1 depicts the microcontroller 100 with the flash memory 107, other types of memory are possible. For example, other types of NVM can be used. In general, the memory is configured so that the read access time of the memory is greater than the microprocessor instruction fetch cycle time, and so that the memory controller can access the memory faster (e.g., using a wider bus) than it can send data to the processor. In these configurations, prefetching can improve microcontroller speed.

The disclosed implementations provide improved performance over conventional microcontrollers. Microcontroller cost can be reduced by having a processor fetch instructions directly from NVM. Microcontroller performance can be improved despite potentially slow response times from NVM by caching loop entry instructions.

Example Memory Controller

Figure 2:
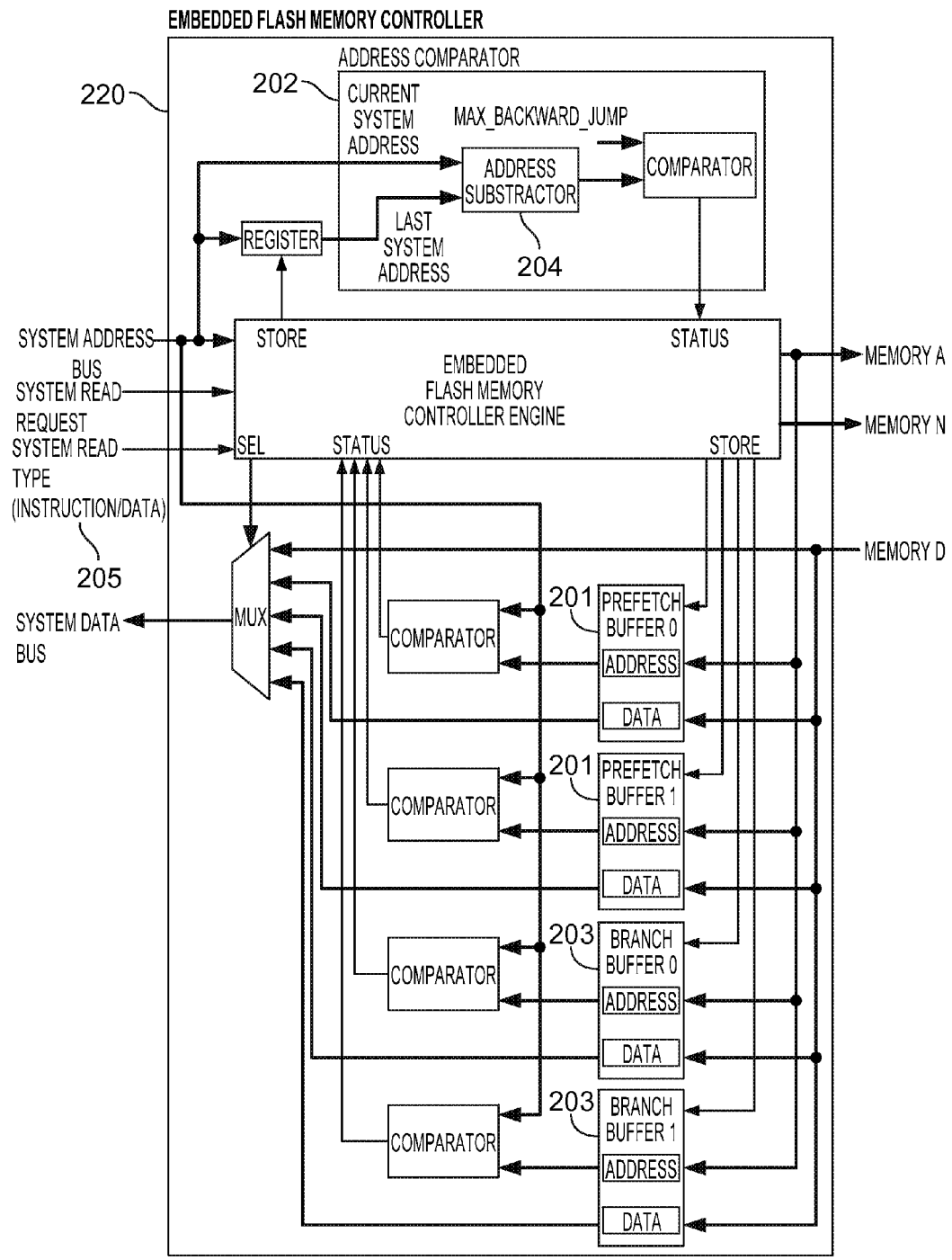
FIG. 2 is a schematic diagram of an example memory controller.

FIG. 2 is a schematic diagram of an example memory controller 220. The memory controller 220 can be used, for example, as the flash memory controller 105 of FIG. 1.

When the memory controller 220 receives a system read request on the system address bus from a microprocessor, the memory controller 220 reads a word from the memory using the memory address bus and an address given by the system read request. The memory controller 220 then prefetches the next word from the memory by fetching the word at the next sequential address after the address given by the system read request. The prefetched next word is stored in the cache. The cache comprises, for example, a pair of prefetch buffers 201. The prefetch buffers 201 can be used in turn so that one is available to be written to with a new word while one is storing a word for an anticipated read request.

When the microprocessor is fetching instructions sequentially from the memory, the prefetch buffers help to minimize the number of wait states of the microprocessor. In some cases, where the memory bandwidth is sufficient, the microprocessor is not waited at all until a break occurs in the instruction sequence.

The address comparator 202 detects backward jumps of a limited range of addresses. Such a backward jump indicates a loop entry instruction. A loop entry instruction is an instruction at the beginning of a loop of instructions that the microprocessor repeats until an end condition is reached. The address comparator 202 indicates a backwards jump of a limited range, for example, using a binary output signal.

The memory controller 220 caches loop entry instructions in a loop entry cache, e.g., a pair of branch buffers 203. The memory controller 220 attempts to cache only loop entry instructions into the loop entry cache. For example, various sequence breaks can occur while the microprocessor is executing instructions, for instance, as the result of an evaluation condition, a function call, an interrupt call, or a loop iteration. Caching the instructions causing those breaks may not improve performance, so the memory controller 220 attempts to distinguish loop entry instructions.

The memory controller 220 attempts to detect loop entry instructions using the address comparator 202; however, the address comparator 202 may in some cases indicate a backwards jump within the limited range for an instruction that is not a loop entry instruction. The memory controller 220 can use additional information to distinguish loop entry instructions. For example, the memory controller 220 can receive a system read type signal 205 from the microprocessor indicating whether a read request is a request for an instruction or for other data. If the request is for other data, then the memory controller 220 determines not to cache the data in the loop entry cache because it is not a loop entry instruction.

Example Loop Instructions

Figure 3:
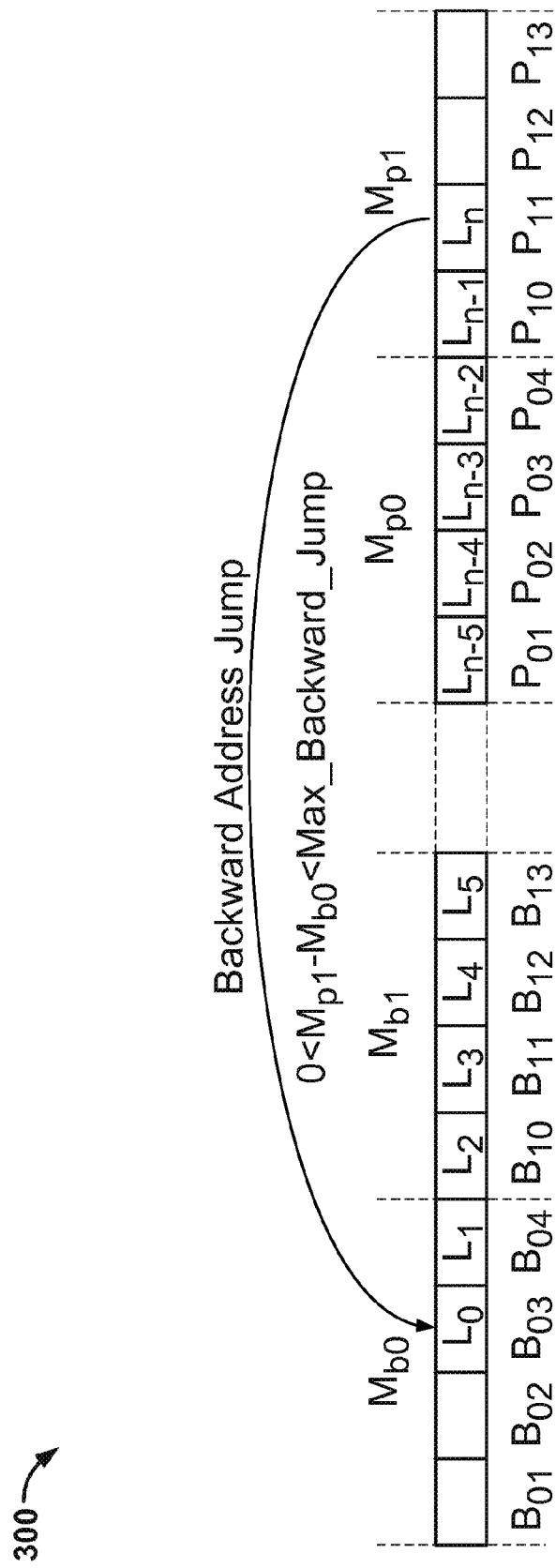
FIG. 3 is a diagram illustrating example microprocessor loop body instructions.

FIG. 3 is a diagram illustrating example microprocessor loop body instructions.

In FIG. 3, the boxes labeled L0 to Ln represent instructions for a microprocessor. Groups of instructions are stored as a memory word. The memory words are shown between vertical dashed lines. The memory words are labeled with memory addresses from Mb0 to Mp1.

Positions within the memory words are labeled with position numbers from B01-B04, B10-B13 P01-PO4 and P1O-P13.

For purposes of illustration, FIG. 3 illustrates an example scenario where L0 is a loop entry instruction, and Ln is the last instruction in the loop. While executing the instructions, the microprocessor requests memory words Mb0 through Mp1 and executes instructions L0 through Ln. After executing Ln, the microprocessor requests Mb0 again so that it can begin executing instructions at L0 again.

When a memory controller detects the backwards jump from Ln to L0, the memory controller stores the memory words Mb0 and Mb1 in a loop entry cache, e.g., the pair of branch buffers 203 shown in FIG. 2. After caching those memory words in the loop entry cache, combining a conventional sequential prefetch mechanism in the memory controller through the loop body with the fast read access to the loop entry cache (branch buffers 203), the whole loop can be iterated with no or minimal wait-states at the microprocessor.

To identify loop entries (e.g., L0), the microprocessor current access memory address is subtracted from the previous access memory address, e.g., by the address subtractor 204 of FIG. 2. In some implementations, the memory controller only stores memory words in the loop entry cache if both the current and previous accesses are recognized as instruction fetches. For example, the microprocessor can provide a read type indicator signal to identify whether it is requesting instructions or other data. If the result of the subtraction is positive but less than a fixed address range (Max_Backward-_Jump), then the memory controller determines that a short backward branch has been taken.

In some implementations, the loop entry caches stores memory words (or pairs of memory words) for multiple loop entries. For example, a register file can be created for an array of memory words determined to contain loop entry instructions.

Caching memory word pairs (Mb0, the memory word containing the loop entry instruction, and Mb1, the next sequential memory word, in FIG. 3) rather than only the memory word containing the loop entry instruction (Mb0 in FIG. 3) can reduce the number of wait-states needed by the microprocessor when re-entering the loop. The first instruction L0 of the loop may lie at any place from the beginning to the end of the targeted memory word Mb0. If the memory access time is longer than the time for the microprocessor to fetch instructions from the loop entry instruction (L0 in FIG. 3) to the first instruction laying inside the next memory word (L2 in FIG. 3) because of the late position of the loop entry instruction L0 inside the branch target memory word Mb0, then the microprocessor will be waited until the second memory word Mb1 is available.

Determining that a backwards jump within a limited range indicates a loop entry relies on the three assumptions: (1) forward jumps, even short ones, are not jumps to loop entries but more likely jumps due to conditional code executed upon test result evaluation or function or interrupt calls or other; (2) short loops show more benefit to having their entries cached (if the loop body instruction length is made of hundreds of instructions then, typically, no significant improvement will be seen by lowering the number of wait-states needed to read the first loop instructions) (3) long backward jumps are more likely not corresponding to short loops entries, but to function or interrupt calls or other sequence breaks, at least in well structured high level languages like C or even from usual assembly code.

In some implementations, the memory controller includes more than a single pair of memory word sized registers in order to cache other outer loop entries for nested loops. These additional pairs can also cache function calls as a side effect, which can improve the performance, if the function is called from inside the loop body.

Process Overview

Figure 4:
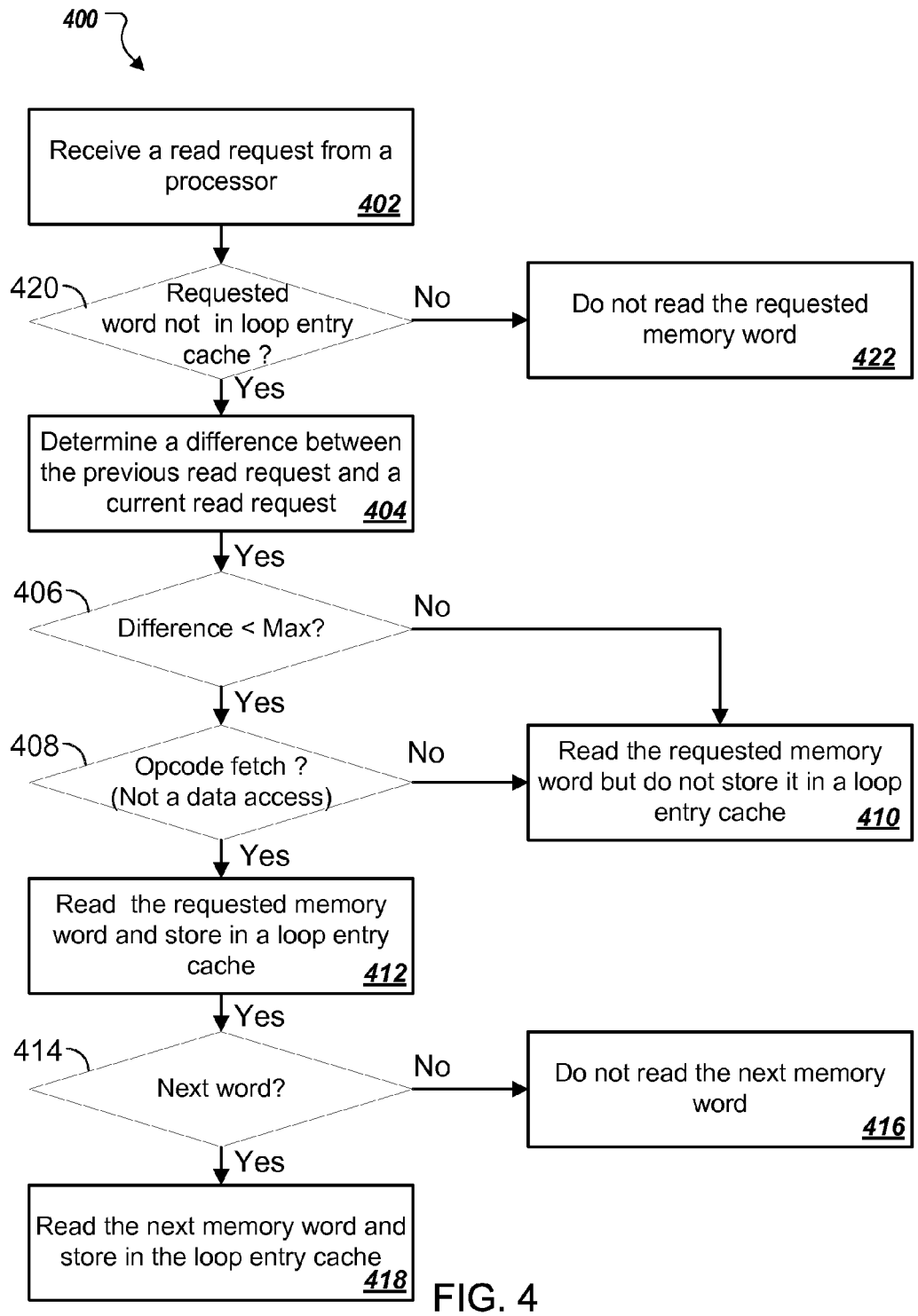
FIG. 4 is a flow diagram of an example process for storing memory words in a loop entry cache.

FIG. 4 is a flow diagram of an example process 400 for storing memory words in a loop entry cache. The process is performed by a memory controller, e.g., the memory controller 220 of FIG. 2.

The memory controller receives a read request from a processor (step 402). The read request specifies a memory address for a memory word stored in a memory, e.g., a flash memory device. The memory controller determines whether the requested memory word is not in the loop entry cache (step 420). In general, the memory controller compares the memory address for the read request with a memory address for a memory word stored in the loop entry cache. In some implementations, the memory address for the memory word stored in the loop entry cache is also stored in the loop entry cache. If the requested word is in the loop entry cache, then the memory controller does not read the requested memory word from the memory (step 422). Instead, the memory controller accesses the loop entry cache for the requested memory word.

The memory controller determines a difference between the address specified by the previously received read request from the processor and the address specified by the current read request (the read request received in step 402) (step 404). The previously received read request is stored, for example, in a register.

The memory controller determines whether the difference is positive and less than a certain difference (step 406). If the difference is negative or greater than the certain difference, the memory controller does not store the requested memory word in a loop entry cache (step 410). If the difference is positive and less than the certain difference, then the requested memory can be considered to contain a loop entry instruction. In some implementations, the memory controller fetches the requested memory word from the memory and stores the memory word in a loop entry cache after determining that the difference is positive and less than the certain difference.

In some other implementations, the memory controller receives a read type indicator from the processor that indicates whether the current address corresponds to a data read or an instruction read. The memory controller determines whether the read type indicator corresponds to a data read (step 408), and if so, does not store the requested memory word in the loop entry cache (step 410). If the memory controller determines that the read type indicator corresponds to an instruction read, the memory controller fetches the requested memory word and stores the memory word in a loop entry cache (step 412).

In some implementations, the memory controller fetches the next memory word that follows sequentially after the requested memory word and stores the next memory word in the loop entry cache (step 418). In some implementations, the memory controller first determines whether to store the next memory word (step 414). The memory controller determines whether to store the next memory word by determining whether a target instruction within the current memory word is after a certain position within the current memory word. If the target instruction is after the certain position, the memory controller determines to store the next memory word (step 418). If the target instruction is not after the certain position, the memory controller determines not to store the next memory word (step 416).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A system comprising a memory controller, wherein the memory controller is configured to receive read requests from a processor and return memory words from memory, and wherein the memory controller comprises:

an address comparator configured to determine a difference between a previous read request address and a current read request address and to determine whether the difference is positive and less than a specified address difference and, if so, indicate a limited backwards jump; and a loop entry cache configured to store a current memory word for the current read request address when the address comparator indicates a limited backwards jump wherein the memory controller is configured to receive a first read type indicator from the processor indicating whether the current read request corresponds to a data read or an instruction read and a second read type indicator from the processor indicating whether the previous read request corresponds to a data read or an instruction read and store the current memory word in the loop entry cache only when both the first and second read type indicators indicate an instruction read.

2. The system of claim 1, wherein the memory controller is configured to receive a new read request address from the processor, determine that the new read request address matches the current read request address, and read the current memory word from the loop entry cache and return the current memory word to the processor.

3. The system of claim 1, wherein the memory controller is configured to receive a read type indicator from the processor indicating whether the current read request address corresponds to a data read or an instruction read, and wherein the loop entry cache is configured to not store the current memory word if the read type indicator indicates that the current read request address corresponds to a data read.

4. The system of claim 1, wherein the loop entry cache is further configured to store a next memory word for a next memory address that follows sequentially after the current read request address.

5. The system of claim 1, wherein the memory controller is configured to determine whether a target instruction within the current memory word is after a specified position within the current memory word, and if the target instruction is after the specified position, to store in the loop entry cache a next memory word for a next memory address that follows sequentially after the current request address, and if the target instruction is not after the specified position, to not store the next memory word in the loop entry cache.

6. The system of claim 1, wherein the loop entry cache is configured to store a plurality of loop entry memory words, each loop entry memory word corresponding to a distinct memory address for which the address comparator indicated a limited backwards jump.

7. The system of claim 1, wherein the memory controller is configured to receive a request for data in the memory and read both the data and additional data located sequentially after the data in the memory prior to receiving a specific request for the additional data, and to store the additional data in a prefetch cache.

8. The system of claim 1, wherein the memory is a non-volatile memory.

9. The system of claim 1, further comprising a system data bus coupled to the memory controller and the processor and a memory data bus coupled to the memory controller and the memory, wherein the memory data bus is wider than the system data bus.

10. The system of claim 1, further comprising the processor and the memory.

11. The method of claim 1, further comprising a plurality of pairs of memory word sized registers configured to cache one or more outer loop entries for nested loops.

12. A method performed by a memory controller, the method comprising:
receiving from a processor a previous read request address and a current read request address for memory words in memory;
determining a difference between the previous read request address and the current read request address;
determining that the difference is positive and less than a specified address difference;
receiving a first read type indicator from the processor indicating whether the current read request corresponds to a data read or an instruction read;
receiving a second read type indicator from the processor indicating whether the previous read request corresponds to a data read or an instruction read; and
based on determining that both the first and second read type indicators indicate an instruction read storing a current memory word from the memory for the current read request address in a loop entry cache.

13. The method of claim 12, further comprising:
receiving a new read request address from the processor;
determining that the new read request address matches the current read request address; and
reading the current memory word from the loop entry cache and returning the current memory word to the processor.

14. The method of claim 12, further comprising:
receiving a read type indicator from the processor indicating whether the current read request address corresponds to a data read or an instruction read; and
if the read type indicator indicates an instruction read, storing the current memory word in the loop entry cache, and if the read type indicator indicates a data read, not storing the current memory word in the loop entry cache.

15. The method of claim 12, further comprising:
storing a next memory word for a next memory address that follows sequentially after the current read request address.

16. The method of claim 12, further comprising:
determining whether a target instruction within the current memory word is after a specified position within the current memory word, and if the target instruction is after the specified position, storing in the loop entry cache a next memory word for a next memory address that follows sequentially after the current request address, and if the target instruction is not after the specified position, not storing the next memory word in the loop entry cache.

17. The method of claim 12, further comprising storing a plurality of loop entry memory words, each loop entry memory word corresponding to a distinct memory address.

18. The method of claim 17, wherein the plurality of loop entry memory words is stored in a plurality of pairs of memory word sized registers.

19. The method of claim 12, further comprising:
receiving from the processor a request for data in the memory;
reading both the data and additional data located sequentially after the data in the memory prior to receiving a specific request for the additional data; and
storing the additional data in a prefetch cache.

20. The method of claim 19, further comprising receiving another request for the additional data and returning the additional data from the prefetch cache without accessing the memory.

21. The method of claim 12, wherein the memory is a non-volatile memory.

22. The method of claim 12, wherein receiving the current read request address comprises receiving the current read request address from a system bus coupled to the processor and the memory controller, and wherein storing the current memory word from the memory comprises accessing the memory on a memory bus coupled to the memory and the memory controller, and wherein the memory data bus is wider than the system data bus.

* * * * *

UNITED STATES PATENT AND TRADEMARK OFFICE
CERTIFICATE OF CORRECTION

| | | |
|---|---|---|
| PATENT NO. | : 8,484,436 B2 | Page 1 of 1 |
| APPLICATION NO. | : 12/874934 | |
| DATED | : July 9, 2013 | |
| INVENTOR(S) | : Franck Lunadier et al. | |

It is certified that error appears in the above-identified patent and that said Letters Patent is hereby corrected as shown below:

On the Title page of patent (item 73) please change assignee to --Atmel Rousset S.A.S., Rousset Cedex, France--.

Signed and Sealed this
Tenth Day of December, 2013

Margaret A. Focarino
*Commissioner for Patents of the United States Patent and Trademark Office*